US011919590B2

(12) United States Patent
Hoffmann

(10) Patent No.: US 11,919,590 B2
(45) Date of Patent: Mar. 5, 2024

(54) BICYCLE COMPONENT WITH AN ADJUSTABLE SEAT POST DEVICE

(71) Applicant: DT SWISS INC., Grand Junction, CO (US)

(72) Inventor: Jerome Hoffmann, Port (CH)

(73) Assignee: DT SWISS INC., Grand Junction, CO (US)

( * ) Notice: Subject to any disclaimer, the term of this patent is extended or adjusted under 35 U.S.C. 154(b) by 347 days.

(21) Appl. No.: 17/235,705

(22) Filed: Apr. 20, 2021

(65) Prior Publication Data

US 2021/0331757 A1    Oct. 28, 2021

(30) Foreign Application Priority Data

Apr. 24, 2020 (DE) .......................... 102020111306.4

(51) Int. Cl.
  *B62J 1/08* (2006.01)
  *B62J 1/06* (2006.01)

(52) U.S. Cl.
  CPC .. *B62J 1/08* (2013.01); *B62J 1/06* (2013.01); *B62J 2001/085* (2013.01)

(58) Field of Classification Search
  CPC ........... B62J 1/06; B62J 1/08; B62J 2001/085
  See application file for complete search history.

(56) References Cited

U.S. PATENT DOCUMENTS

| 10,513,300 B2 * | 12/2019 | Bowers ..................... B62K 3/02 |
| 10,689,049 B2 | 6/2020 | Chiesa |
| 10,752,308 B2 | 8/2020 | Eberlberger |
| 2008/0303320 A1 * | 12/2008 | Schranz ................... B62K 19/36 297/215.14 |
| 2011/0097139 A1 * | 4/2011 | Hsu ........................... B62J 1/06 403/109.1 |

(Continued)

FOREIGN PATENT DOCUMENTS

| DE | 9216170 U1 | 1/1993 |
| WO | 2009083206 A1 | 7/2009 |
| WO | 2016029301 A1 | 3/2016 |

OTHER PUBLICATIONS

German Search Report received for German Application No. 102020111306.4 dated Feb. 15, 2021.

(Continued)

*Primary Examiner* — Tony H Winner
(74) *Attorney, Agent, or Firm* — Greer, Burns & Crain, Ltd

(57) ABSTRACT

A bicycle component for an at least partially muscle-powered bicycle, including a seat post device adjustable between two positions, with two support members telescopically movable relative to one another in the axial direction namely, a first support member and a second support member. The bicycle component has an anti-twist protection with a clamping element that non-rotatably couples the support members together, and which is displaceably received in a guiding groove, so that rotational movement of the first support member relative to the second support member can be at least partially blocked. The anti-twist protection includes a spline device with a spline unit that can be pressed against the clamping element in the axial direction. By pressing the clamping element and the spline unit together, the clamping element can be moved relative to the guiding groove transverse to the axial direction.

26 Claims, 13 Drawing Sheets

(56) References Cited

U.S. PATENT DOCUMENTS

| | | | |
|---|---|---|---|
| 2011/0187166 A1* | 8/2011 | Walsh | B62J 1/08 297/215.13 |
| 2013/0119634 A1* | 5/2013 | Camp | B62K 19/36 280/287 |
| 2014/0061419 A1* | 3/2014 | Wehage | B62J 1/06 248/404 |
| 2014/0205372 A1 | 7/2014 | Kuo | |
| 2019/0106171 A1 | 4/2019 | Eberlberger | |
| 2022/0081050 A1* | 3/2022 | Hoffmann | B62J 1/08 |

OTHER PUBLICATIONS

Supplemental European Search Report received for Application No. 21169699.2 dated Aug. 5, 2021.

* cited by examiner

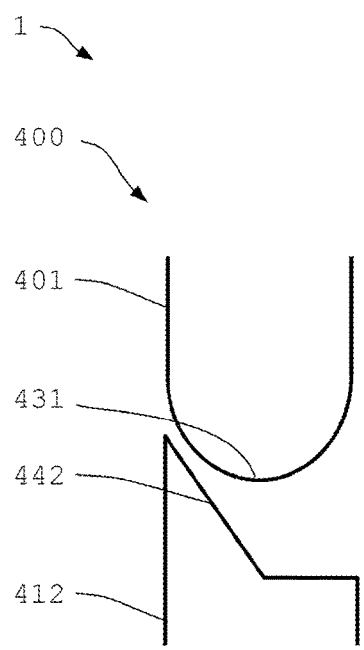
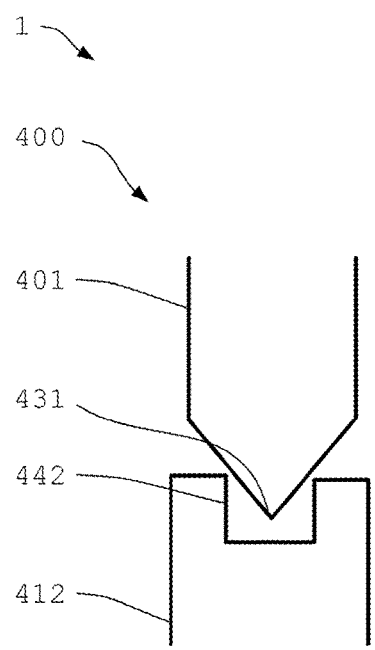
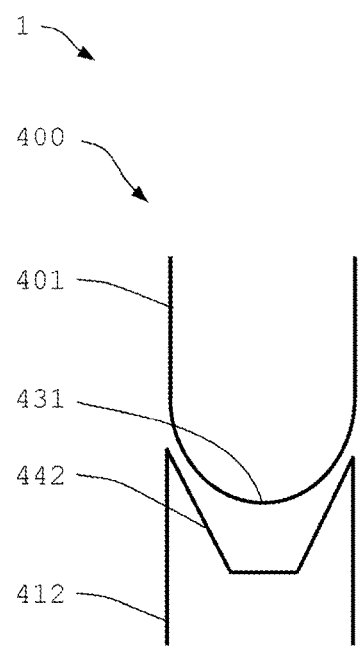
Fig. 8
Fig. 9
Fig. 10

BICYCLE COMPONENT WITH AN ADJUSTABLE SEAT POST DEVICE

BACKGROUND

The present invention relates to a bicycle component for an at least partially muscle-powered bicycle having a seat post device adjustable between at least two positions. The seat post device comprises at least two support members telescopically movable relative to one another in an axial direction.

These adjustable seat posts, also referred to as telescopic seat posts, offer speedy and simple adaptation of the saddle height to the current riding situation. Namely, optimal settings of the saddle height are important for safe control of the bicycle and for an optimal force transmission. This applies both to everyday or city bikes and to sports bicycles.

For example, in downhill rides the saddle must be in a low position for the rider to shift his weight behind the saddle so as to shift the center of gravity rearwardly. Riding in the sitting position calls for an ergonomic saddle height setting to allow optimal force application to the drive.

These seat posts tend to be provided with an anti-twist protection to prevent the saddle from twisting in operation and also while lowering or extending the seat post device. To this end, a number of clamping elements are as a rule employed for non-rotatably interlinking the support members. To enable telescoping, each of the clamping elements is displaceably supported in a guiding groove.

However, these anti-twist protections may allow slight though clearly perceptible saddle rotation. In order to eliminate such rotation play, the clamping elements and the guiding groove must show a highly precise fit. This is why these components of the anti-twist protection must as a rule be manufactured with a particularly low tolerance. This results in high overhead regarding time and costs.

It is therefore the object of the present invention to provide an improved bicycle component with a reliable while uncomplicated anti-twist protection which allows economic production. The anti-twist protection is, in particular, intended to show a particularly narrow rotation play.

SUMMARY

The bicycle component according to the invention is provided for an at least partially muscle-powered bicycle. The bicycle component comprises a seat post device that is adjustable between at least two positions. Adjustment serves, in particular, for adapting the saddle height. The seat post device comprises at least two support members telescopically movable relative to one another in an axial direction. The support members comprise at least one first support member and at least one second support member. The bicycle component comprises at least one anti-twist protection with at least one clamping element that non-rotatably interlinks the support members. The clamping element is displaceably received in a guiding groove. By means of the anti-twist protection, a rotational movement of the first support member relative to the second support member can be blocked, at least partially and in particular form-closed. A preferred anti-twist protection comprises at least one spline device with at least one spline unit that can be pressed against the clamping element in the axial direction. Preferably, pressing the clamping element and the spline unit together causes the clamping element to move transverse to the axial direction relative to the guiding groove and/or relative to the spline unit.

The bicycle component according to the invention offers many advantages. A considerable advantage is offered by the anti-twist protection with the spline unit, which cooperates with, and moves, the clamping element. Thus, undesired rotation play can be considerably reduced or even completely compensated. At the same time, the invention allows greater manufacturing tolerances without having to accept undesired play or twisting of the saddle. Therefore, manufacturing the bicycle component is particularly uncomplicated and economic. Thus, greater tolerances in manufacture notwithstanding, the invention offers considerably reduced rotation play, when the clamping element and the spline unit are pressed together.

Preferably, the clamping element and the spline unit can be pressed together at least by adjusting the seat post device. Thus, the rotation play can be blocked, together with setting the saddle height. The clamping element and the spline unit can, in particular, be pressed together in the axial direction. The clamping element and the spline unit can be moved relative to one another, and thus pressed together, in particular, by telescopically moving the seat post device in the axial direction. Pressing together is, in particular, done in the movement direction of the adjusting movement.

Preferably, the clamping element and the spline unit can be pressed together by telescoping the seat post device. In particular, is the anti-twist protection suitable and configured to compensate rotation play only when the seat post device is in the extended position, by way of pressing the spline unit and the clamping element together. Alternately, the clamping element and the spline unit can also be pressed together by retracting the seat post device.

In a particularly advantageous configuration, the clamping element and the spline unit are, or can be, pressed together in at least one of the positions, and particularly preferably in the extended position of the seat post device. This configuration has been found to be particularly advantageous since rotation play in the extended position is perceived as a particular nuisance. The extended position is e.g., provided for sitting while riding, so that a saddle seat without play is of particular advantage. In the lowered position, the rider is as a rule standing up, so that rotation play is no problem. During adjusting, rotation play rather has no influence on the comfort and performance of the seat post device.

Preferably, the clamping element and the spline unit are, or can be, pressed together in one of the positions only. The clamping element and the spline unit are, in particular, not pressed together external of the position and preferably, external of the extended position. External of the position, the clamping element and the spline unit are, in particular, spaced apart from one another. The clamping element and the spline unit may, or can, be pressed together in another position, e.g., in the retracted position as well.

Preferably and advantageously, the support members are provided to be braced against one another by way of pressing the clamping element and the spline unit together. In this way, in particular a rotation play between the support members can be at least partially blocked, in at least one rotational direction, and particularly preferably in both rotational directions. The applicant reserves the right to claim such a configuration of a bicycle component according to the introductory portion of claim 1. When the clamping element and the spline unit are spaced apart respectively not pressed together, the support members are, in particular, not braced against one another. Absent the pressing of the clamping element and the spline unit together as intended, rotation play between the support members forms, in particular, in at least one and in particular in both rotational directions.

It is also advantageous and preferred for the anti-twist protection to show one guiding groove and/or one clamping element only. Thus, the bicycle component has a particular low weight and at the same time allows particularly uncomplicated manufacture. The known seat posts are as a rule provided with three guiding grooves and three clamping elements with particularly low tolerances, so as to counteract the rotation play. The invention, however, shows that an anti-twist protection without any, or with a particularly narrow, play can be reliably implemented with one guiding groove respectively one clamping element only. Such an anti-twist protection also comprises in particular one spline unit only.

It is possible, however, for the anti-twist protection to have at least two or at least three or more guiding grooves and/or clamping elements. Then, for example the guiding groove respectively the clamping element are distributed over the radial circumference of the pertaining support member, for example at angles of 120°.

The clamping element is, in particular, received in the guiding groove with a minimum play. Preferably this ensures controlled displacement and/or (very slight) tilting of the clamping element in the guiding groove by means of the spline unit. The minimum play is, in particular, formed transverse to the axial direction. The guiding groove is, in particular, configured wider and/or higher than the clamping element by a defined minimum measure. Such a minimum play enables reliable compensation of the rotation play while at the same time considerably simplifying manufacture.

The clamping element and the spline unit can preferably be supported on one support member each as they are pressed together. The clamping element can, in particular, be supported on the first support member. The spline unit can, in particular, be supported on the second support member. Also possible is a reverse configuration, so that the clamping element is supported on the second support member and the spline unit, on the first support member. The support members serve, in particular, as abutment for the forces when pressing the clamping element and the spline unit together, and for wedging the clamping element in the guiding groove.

It is preferred and advantageous that by pressing the clamping element and the spline unit together, the clamping element can be displaced and/or tilted sideways (transverse to the axial direction). In this way, in particular at least one longitudinal face of the clamping element can be pressed against at least one longitudinal wall of the guiding groove at least in sections. In particular, can the clamping element be displaced such that it bears against the longitudinal wall over its entire longitudinal face. Due to the tilting, the clamping element bears against the longitudinal wall with the longitudinal face, in particular, in sections only.

In particular, is the clamping element displaceable in the axial direction within the guiding groove, as the seat post device is displaced between the positions (as the support members are telescoping). The clamping element and the guiding groove are, in particular, displaceable relative to one another as the seat post device is being adjusted. The clamping element is, in particular, disposed axially displaceable in the guiding groove.

In a preferred and advantageous configuration, the guiding groove and the spline unit are disposed on a shared (the same) support member. In particular, the guiding groove is configured on the support member to which the spline unit is also fastened. It is preferred for the clamping element to be fastened to a support member other than the guiding groove and the spline unit. The guiding groove and the spline unit are, in particular, disposed on the second support member and the clamping element, on the first support member.

Preferably, the spline unit and/or the guiding groove are disposed on a radially inside surface of the second support member. The spline unit and/or the guiding groove are, in particular, fastened or configured thereat. Preferably the clamping element is disposed on, and, in particular, fastened to, a radially outside surface of the first support member.

The spline unit is, in particular, immovably fastened to the support member. Alternately, the spline unit may be at least partially movably fastened to the support member. Then, the movability is, in particular, blocked by way of pressing the clamping element and the spline unit together. The spline unit is, in particular, secured, and in particular fastened movably or immovably to the support member by way of at least one, preferably screwed, retaining member.

The bicycle component comprises in particular at least one (mechanical) stopper for the adjusting movement, so that the support members cannot telescope beyond the extended position and/or cannot be inadvertently detached from one another. The retaining member may provide such a stopper.

The guiding groove is, in particular, disposed in and/or on the support member. The guiding groove is, in particular, incorporated in the support member. The guiding groove is, in particular, configured integrally with the support member. Alternately, the guiding groove may be a separate component fastened to the support member. The guiding groove, in particular, extends in the axial direction in and/or on the support member. The guiding groove is, in particular, disposed on and/or in a wall of the support member. The guiding groove is, in particular, configured recessed on the inside surface.

The clamping element is, in particular, fastened to the support member such that, if it hits the spline unit, it cannot, or only partially, deflect in the axial direction. The clamping element is fastened to the support member immovably, in particular at least in the axial direction. The clamping element may be at least partially movable, and for example displaceable or tiltable, transverse to the axial direction. Preferably, the clamping element is fastened to the support member immovable, transverse to the axial direction. The clamping element is, in particular, movable only together with the support member to which it is fastened.

In a particularly preferred configuration, the support member, which is equipped with the guiding groove, shows an increased wall thickness at least in the region of the guiding groove. In particular, does this result in a non-round cross-sectional contour of the support member. The wall thickness is, in particular, increased relative to a region external of the guiding groove. The cross-sectional contour is, in particular, oval and for example elliptical. Such a support member is particularly sturdy while also providing a particularly low weight. Such a configuration is particularly advantageous in a configuration having one guiding groove only.

It is possible and preferred for the clamping element to be partially recessed in at least one receiving space of the first support member. It is, in particular, provided for the clamping element to partially protrude beyond the outer periphery of the first support member. It is also provided for the clamping element (in an operational mounting state) to project into the guiding groove of the second support member. The receiving space is, in particular, disposed on, respectively accessible from, the radially outwardly surface in particular of the first support member. The clamping element is, in particular, fastened in the receiving space and/or form-fittingly accommodated in the receiving space.

It is preferred and advantageous for the first support member to be rotatable, or be rotated, relative to second support member by way of pressing the clamping element and the spline unit together. The support members are, in particular, rotatable relative to one another until the clamping element bears against the longitudinal wall of the guiding groove with its longitudinal face.

The clamping element is preferably disposed on an upper end portion of the first support member. The spline unit is preferably disposed on a lower end portion of the second support member. Such a configuration allows reliable and uncomplicated compensation of the rotation play, for example in a so-called upside-down arrangement of the support members.

The spline unit preferably comprises at least one spline section. The spline section extends, in particular, in the guiding groove. The spline unit comprises in particular at least one linking section. The linking section is, in particular, disposed external of the guiding groove and is in particular at least partially recessed in the second support member. It is preferred for a fit of the linking section at respectively in the second support member to show a lower tolerance than does a fit of the spline section at or in the second support member, in particular, in the guiding groove. This enables an uncomplicated while precise alignment of the spline unit to the guiding groove. Thus, the spline unit can be aligned and fastened independently of the guiding groove.

It is possible for the spline section to be received in the guiding groove with play. In particular, is the spline unit aligned relative to the guiding groove by way of the linking section. The spline section can, in particular, be pressed against the clamping element. The spline section is, in particular, provided with a spline profile.

It is possible that the spline unit is provided by a spline section and, in particular, by one spline section only. Then, the spline unit is, in particular, disposed substantially completely, and in particular completely, in the guiding groove.

In an advantageous specific embodiment, the bicycle component comprises at least one locking device for locking the seat post device in at least one of the positions, and in particular at least in both positions. The locking device is preferably suitable and configured to fix the clamping element and the spline unit in a state of being pressed together. The locking device is, in particular, suitable and configured to secure the clamping element in a position in which it is pressed against the longitudinal wall of the guiding groove. The locking device is, in particular, suitable and configured to fix the support members in a state of being braced against one another. The rotation play between the support members is, in particular, locked in at least one, and preferably both, of the rotational directions while the locking device is locking the seat post device in a position. The locking device is, in particular, suitable and configured to fix the clamping element and the spline unit in a state of being pressed together when an extended position or a retracted position is given.

In an advantageous and preferred configuration, the anti-twist protection is disposed at least partially, in particular, completely, above a bolt member of the locking device. In particular, at least the clamping element and/or at least the spline unit and/or at least the guiding groove are at least partially disposed above a bolt member of the locking device. Such a configuration offers many advantages in respect of locking and also in respect of the anti-twist protection. In a likewise advantageous configuration, the spline unit is at least partially disposed beneath the bolt member. The spline unit may be disposed partially overlapping with the bolt member.

The locking device preferably comprises at least one bolt member. In the locked state the bolt member extends, in particular, through at least one wall of the first support member into the second support member. For example, at least one bore is disposed in the wall. A plurality of bolt members is, in particular, provided. In the locked state the bolt member, in particular, extends only into part of the wall of the second support member. The locking device is, in particular, suitable and configured to urge the bolt member at least partially into the second support member by means of at least one piston member. A locked position is, in particular, given if the piston member urges the bolt member into the second support member. The one or more bolt member/s is/are preferably inserted detachably and, in particular, unguided. In an advantageous configuration the bolt member comprises, or is configured as, at least one sphere.

The bicycle component comprises in particular at least one energy storage device. The energy storage device is, in particular, suitable and configured to be at least partially loaded by way of retracting the seat post device, and/or at least partially unloaded by extending the seat post device. This allows the seat post device to extend in particular at least partially automatically.

It is preferred and advantageous for the energy storage device to be suitable and configured for pressing the clamping element and the spline unit together. Thus, the automatic extension concurrently enables compensation of the rotation play. The energy storage device is, in particular, disposed inside of the second support member. The energy storage device is, in particular, loaded by the first support member retracting into the second support member, and/or at least partially unloaded by the first support member extending out of the second support member. The energy storage device comprises in particular at least one spring and e.g., a coil spring or gas spring.

Preferably, the spline unit comprises at least one spline profile that is canted at least in sections. Preferably, the clamping element comprises at least one clamping profile interacting with the spline profile. Preferably, the clamping profile is at least partially rounded. The clamping profile is, in particular, formed pitch-circular and e.g., semicircular or curve-shaped. The clamping profile may also be canted at least in sections. Other suitable geometries for the clamping profile are likewise conceivable. The spline profile is, in particular, entirely canted. The spline profile may be at least partially rounded. The spline profile may be configured canted in sections, and flat or plane in sections. It is also possible for the spline profile to be V-shaped or U-shaped. Alternately, the spline profile may be configured pitch-circular or curve-shaped.

The clamping element is, in particular, configured rod-shaped. The clamping element in particular shows a polygonal and preferably square cross section. The clamping element may also show a round cross section. The clamping element in particular shows a cross section corresponding with the cross section of the guiding groove.

It is possible for the anti-twist protection to provide, at least supplementarily, an axial guide for adjusting the seat post device. The support members are, in particular, guided in the axial direction by the guiding groove and the clamping element for adjusting. It is possible for the anti-twist protection to be suitable and configured to also, at least partially, block an axial play in at least one of the positions and, in particular, in the extended position.

The second support member is, in particular, suitable and configured to receive a saddle. The first support member is, in particular, configured to be fastened to, or formed on, the frame structure of a bicycle. It is also possible for the second support member to be provided for fastening to, or to be configured on, the frame structure. Then the first support member is, in particular, configured to receive a saddle.

The first support member is preferably disposed inside the second support member, at least in sections. For telescoping the seat post device, the second support member can, in particular, be moved over the first support member in the axial direction, at least in sections. A reverse configuration is also possible, so that the second support member is disposed inside the first support member, at least in sections. Then, for telescoping, the first support member can be moved over the second support member, at least in sections.

It is possible that by pressing the clamping element and the spline unit together, the clamping element can be centrally aligned in the guiding groove. Then the clamping element can, in particular, be moved in the peripheral direction. Such a configuration offers considerable reduction of the rotation play in both rotational directions, and its implementation is particularly uncomplicated. Due to the central alignment of the clamping element in the guiding groove, any rotation play is no more perceptible or only very slightly. The clamping element is, in particular, moved by the spline unit, and in particular aligned, between two opposite longitudinal walls of the guiding groove. In such a configuration the spline profile is particularly preferably V-shaped or U-shaped. Then the clamping element is, in particular, configured rounded or pointed.

The bicycle according to the invention is at least partially muscle-powered and comprises at least one bicycle component as it has been described above. The bicycle according to the invention also solves the object indicated above particularly advantageously.

The clamping element, in particular, provides between the support members, a connection that is form-closed in the rotational direction. The clamping element is, in particular, disposed between the support members. The clamping element extends, in particular, from the radially outside surface of the first support member to the radially inside surface of the second support member.

The axial direction, in particular, corresponds to the longitudinal axis of the seat post device and preferably of the support members. The axial direction, in particular, corresponds to the axis of movement of an adjustment movement. The anti-twist protection in particular blocks a rotational movement around a rotation axis extending in the axial direction. The rotation axis of the rotation play extends, in particular, in the axial direction.

The pressing together in particular compensates any play of the anti-twist protection, and particularly preferably, play of the clamping element in the guiding groove. This, in particular, compensates any rotational play between the support members. Pressing the clamping element and the spline unit together also compensates a (very slight) tilting movement of the first support member relative to the second support member. The anti-twist protection serves to at least partially compensate an axial play between the support members. A compensation of play is, in particular, understood to mean, at least partially blocking or eliminating the play.

For pressing together, the spline unit and the clamping element can, in particular, be moved relative to one another.

By way of pressing together, the spline unit acts on the clamping element, such that the clamping element moves transverse to the axial direction and/or in the peripheral direction (of the support members). The pressing of the clamping element and the spline unit together in particular always results in movement of the clamping element relative to the guiding groove transverse to the axial direction. In the scope of the present invention, the term spline or spline unit is understood to mean any geometric shape suitable for fulfilling the spline principle or clamping principle described herein. The spline unit can, in particular, move the clamping element in the peripheral direction.

The clamping element moves, in particular, relative to the guiding groove. The clamping element may be fixed while the guiding groove is movable. It is also possible for the guiding groove to be fixed, while the clamping element is movable. It is also possible for both the clamping element and the guiding groove to be movable.

It is possible to compensate the rotation play, other than in the extended position, additionally also in the retracted position. To this end, the spline device comprises in particular at least one further spline unit. The further spline unit and the clamping element or another clamping element can be pressed together in the retracted position of the seat post device, preferably only in the retracted position.

In all the configurations, it is possible for the spline device to comprise at least two or at least three or more spline units. It is also possible for the spline device to comprise at least two or at least three or more further spline units. It is possible for the anti-twist protection to comprise at least two or at least three or more clamping elements. For the clamping elements, in particular at least one guiding groove each and/or at least one spline unit each, and optionally at least one further spline unit each are provided.

The seat post device is in particular (only) adjustable between two positions (extended, saddle up, and retracted, saddle down). The positions are, in particular, end positions. In particular, no intermediate positions are provided. In simple configurations, the bicycle component may be configured as a seat post. Tubular support members are preferably provided. Preferably, the support members are at least partially hollow.

BRIEF DESCRIPTION OF THE DRAWINGS

Further advantages and features of the present invention can be taken from the description of the exemplary embodiments which will be discussed below with reference to the enclosed figures.

The figures show in:

FIGS. 8-10 simplistic detail illustrations of anti-twist protections of the bicycle component in various configurations;

DETAILED DESCRIPTION

Figure 1:
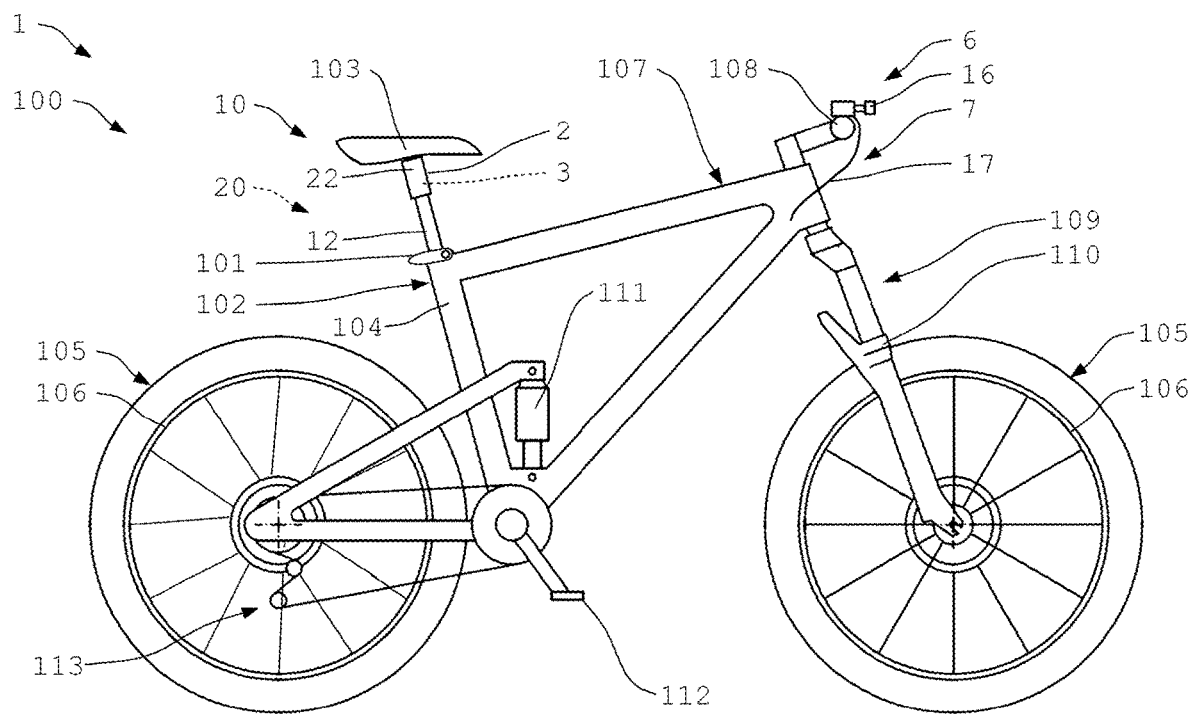
FIG. 1 a simplistic illustration of a bicycle with an inventive bicycle component.
Figure 2:
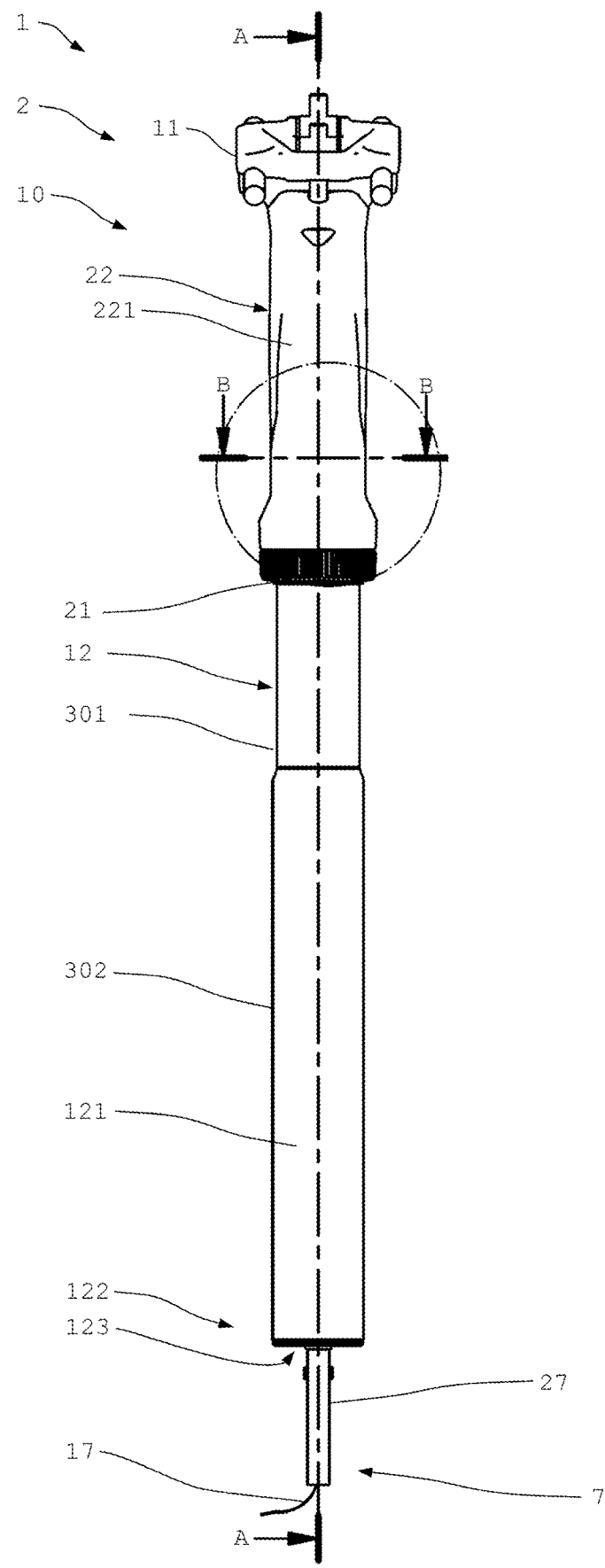
FIG. 2 a schematic illustration of an inventive bicycle component in a side view.

FIG. 1 shows a bicycle 100 configured as a mountain bike with an inventive bicycle component 1. The bicycle 100 may also be configured as a partially muscle-powered two-wheeled vehicle and for example an E-bike.

The bicycle 100 comprises two wheels 105, each equipped with a hub and a rim 106. The bicycle 100 is a full suspension bicycle. The fork 109 is configured as a suspension fork 110, and the frame 107 comprises a rear wheel damper 111.

Furthermore, the bicycle 100 comprises a saddle 103, a frame 107, a handlebar 108 and other bicycle components. This bicycle 100 comprises a derailleur 113 forming part of a pedal drive 112. Moreover, the bicycle 100 includes a brake device not shown in detail.

The bicycle component 1 comprises an adjustable seat post device 2 which is accommodated in a frame structure 102 configured as a seat tube 104. The seat post device 2 is fastened in the seat tube 104 by means of a seat tube clamp 101.

The seat post device 2 is configured adjustable so that the saddle 103 can be fixed in various positions or saddle heights respectively. To this end the seat post device 2 comprises two support members 12, 22 provided for telescopic extending and pushing into one another.

The illustration shows the seat post device 2 in a first position 10 extended to the maximum. A lower saddle height may also be set. Thus, the seat post device 2 is pushed together and put in a second position 20 retracted to the maximum, not shown in detail. One configuration provides for the seat post device to be adjusted to one or more intermediate positions.

For locking a set saddle position, the bicycle component 1 comprises a locking device 3 disposed in the interior of the seat post device 2, not visible here. For releasing or actuating the locking, an actuating device 6 is provided with a control 16 attached to the handlebar 108.

The actuating device 6 comprises a cable control 7 with a control cable 17. The cable control 7 may comprise various components for guiding the control cable 17, for example pulleys or the like. This control cable 17 extends from the control 16 into the frame 107 and through the seat tube 104 up to the seat post device 2, and preferably indirectly, or directly, to the locking device 3. A supporting device 27 serves to receive and support a control cable sleeve, not shown in detail.

The control cable 17 is for example tensioned by way of the control 16 to release the locking device 3. Then the rider can either urge the saddle downwardly or upwardly when sitting down or lifting his weight, supported by an energy storage device 9, not shown. Then the seat post device 2 locks in the current position 10, 20. It is also possible to provide continuous adjustment, so that e.g., the saddle 103 remains in position as the control 16 is released.

FIGS. 2 to 6 show various illustrations of a bicycle component 1 according to the invention. The bicycle component 1 will now be described in detail with reference to the FIGS. 2 to 6.

The bicycle component 1 comprises a seat post device 2 having a first or bottom support member 12 and a second or top support member 22. The two support members 12, 22 are telescopic.

The top support member 22 is equipped with a saddle accommodation 11 for mounting a saddle to the seat post device 2. The second support member 22 may be a separate part, or it may alternately be configured integrally with the frame structure of the bicycle, or alternately fixed or provided to be fixed thereto.

A seal 31 or O-ring is disposed at the end of the top support member 22 opposite the saddle accommodation 11. The top support member 22 shows a collar to receive the seal 31. A mud guard 21 is disposed at the end of the support member 22 opposite the saddle accommodation 11. This serves to wipe off dirt in retracting.

Figure 3:
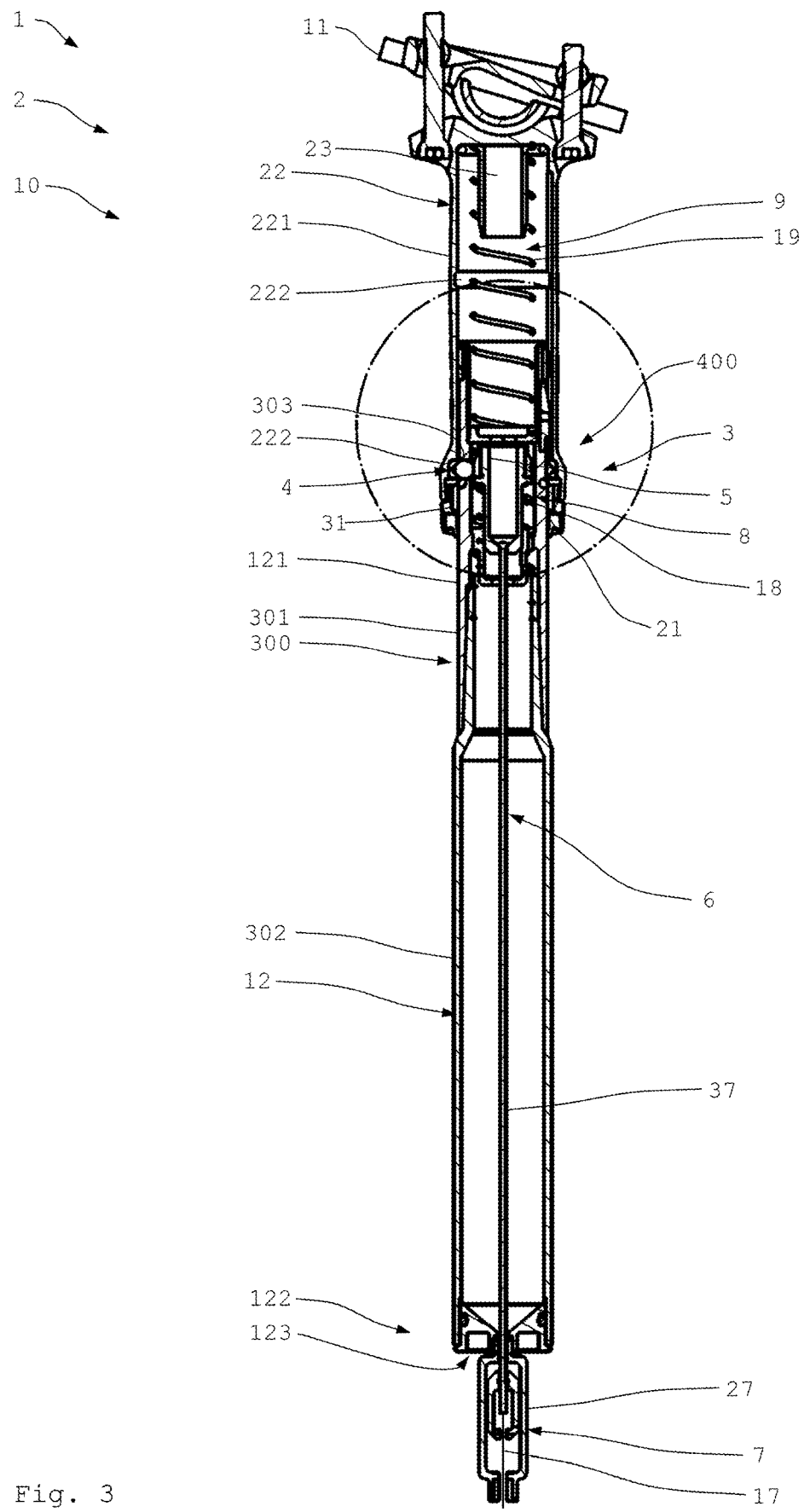
FIG. 3 the bicycle component in an illustration sectioned along the line A-A in FIG. 2 in a side view.
Figure 4:
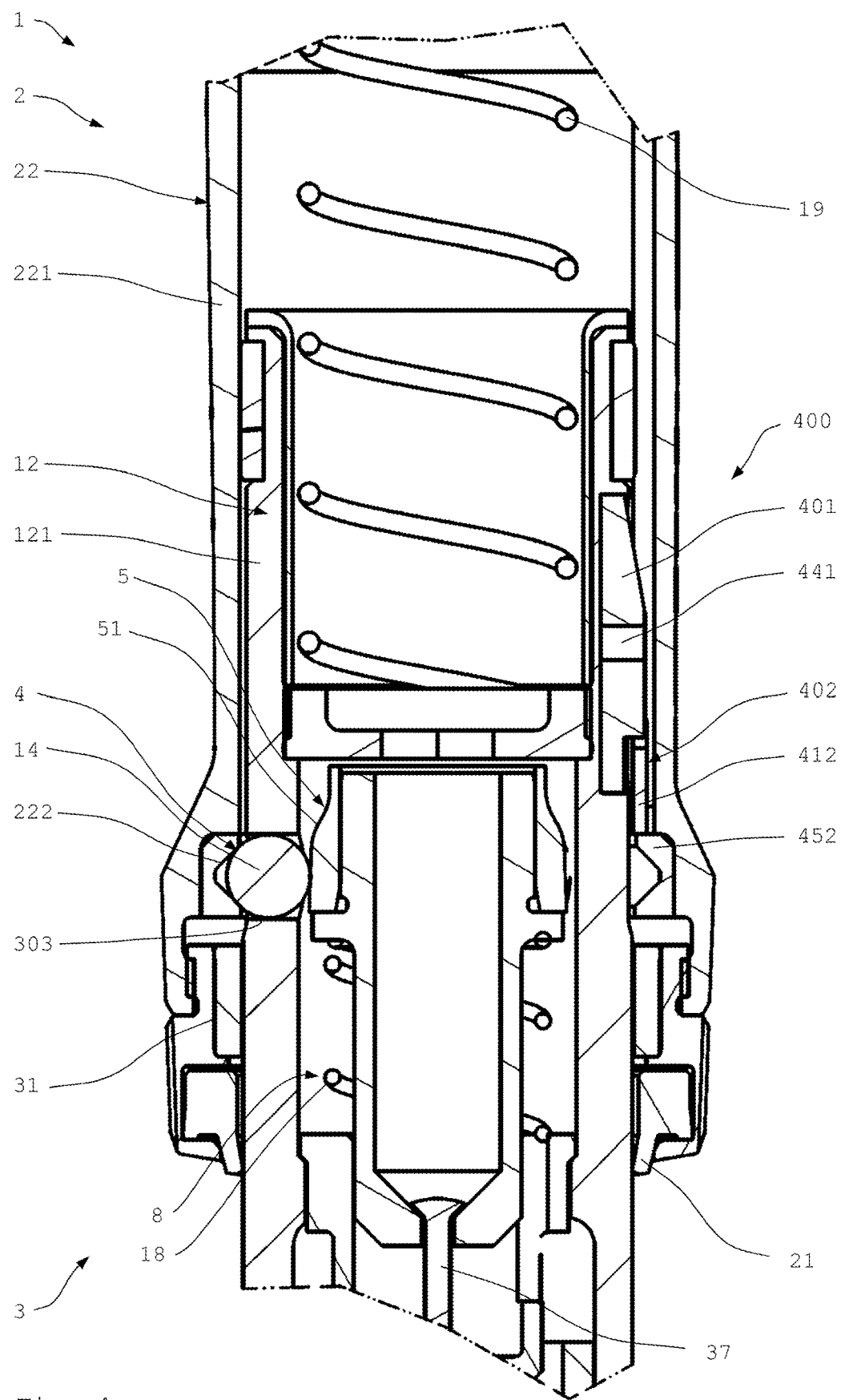
FIG. 4 a sectional detail illustration of the bicycle component in FIG. 3.

FIGS. 3 and 4 clearly show the interior components of the bicycle component 1. The locking device 3 is disposed substantially inside the first support member 12. The locking device 3 comprises a plurality of bolt members 4, only one of which is visible. The bolt members 4 are configured as spheres 14.

The bolt members 4 extend through a wall 121 of the first support member 12. The wall 121 shows a through hole 303 therefor. The bolt member 4 extends further into a part of a wall 221 of the second support member 22. A recess 222 is configured for the bolt member 4. The recess 222 is circumferential respectively circular. Alternately, a configuration is conceivable where a recess 222 is provided for each of the bolt members 4.

The bolt members 4 are pressed into the recess 222 by way of a piston member 5 or a cone 51 of the piston member 5 respectively. In this position, the bolt members 4 prevent the second or top support member 22 from lowering further. The saddle height respectively positions of the two support members 12, 22 to one another is/are thus locked. The piston member 5 and the bolt members 4 are in a locked or blocked position. The top position 10 of the bicycle component 1 or of the seat post or seat post device 2 is illustrated here. The bolt members 4 are locked in the bottom recesses 222 of the second support member 22.

The piston member 5 is pulled downwardly in the direction of the longitudinal axis of the support members 12, 22 to release the locking device 3 and retract the seat post device 2. Then the piston member 5 is transferred to a release position. In the release position, pressure on the saddle, for example by the rider's weight, lowers the saddle height.

This piston member 5 is conical, tapering toward the top end. When the piston member 5 is pressed downwardly, the bolt members 4 cease to be urged into the recess 222 (via the cone 51). Thus, the top support member 22 can be pushed over the bottom support member 12.

For locking the saddle height in the retracted, lower position 20 the locking device 3 comprises an additional recess 222 further upwardly. The piston member 5 can force the bolt members 4 in so as to lock the seat post device 2 in this position.

The bicycle component 1 comprises an energy storage device 9 configured as a spring 19 which is biased as the seat post device 2 is retracted. To this end the spring 19 is configured as a compression spring. While the seat post device 2 is locked in the bottom position 20 and the piston member 5 is transferred to the release position, the top support member 22 is automatically moving upwardly together with the saddle due to the force of the biased spring 19.

To reliably retain the piston member 5 in the locked position, the locking device 3 is provided with a biasing device 8. The biasing device 8 comprises a spring 18 which automatically urges the piston member 5 to the locked position.

The piston member 5 is moved between the release position and the locked position by means of an actuating device 6 having a cable control 7. To release the lock the piston member 5 is pulled downwardly by means of a control cable 17 of the cable control 7. While the control cable 17 is tensioned, the piston member 5 remains in the release position and the bolt members 4 are not urged into the recess 222. As the control cable 17 is released, the biasing device 8 urges the piston unit 5 back into the locked position.

Actuating the cable control 7 is provided for example by means of a control 16 as it was described with reference to the FIG. 1. The cable control 7 comprises a coupling member 37, which extends between, and is linked to, the control cable 17 and the piston member 5. This offers many advantages as regards mounting and servicing, and also offers reliable protection for the internal components.

Advantageously, the coupling member 37 is a wire, and for example a spoke wire or a spoke respectively spoke section. Other wires or rods or the like are also possible. The coupling member 37 may be provided as another control cable. Alternately, a continuous control cable 17 may be provided. FIG. 4 clearly shows a (conical) (spoke) head of the coupling member 37, which is accommodated in the piston member 5.

The coupling member 37 extends through the lower support member 12 which it exits at one end 122, which can be accommodated in the saddle tube 104 of the bicycle 100. The coupling member 37 exits from the support member 12 on an axial front face 123. The supporting device 27 also supports on this axial front face 123, a control cable sleeve for the control cable 17, not shown in detail. The operating force is transmitted from the supporting device 27 to the piston member 5 via the coupling member 37. The control cable 17 extends from the supporting device 27 up to the control 16 fastened to the handlebar 108.

The control cable 17 extends through the bottom support member 12 which it exits at an end 122 that can be received in the seat tube 104 of the bicycle 100. The control cable 17 is received in a protecting tube 37. The control cable 17 exits from the support member on an axial front face 123. The supporting device 27 also supports on this axial front face 123 a control cable sleeve, not shown in detail.

The first support member 12 is built of two tubular support sections 301, 302 joined together in a connecting area 300. The support sections 301, 302 are disposed to overlap in the connecting area 300. The support section 301, which in the operational state is on top, shows a wall thickness greater than that of the bottom support section 302. The top support section 301 comprises the through hole 303 for the bolt members 4. Moreover, the piston member 5 is guided in the top support section 301.

The first support member 12 comprises an outside surface 120 matched to the inside surface 220 of the second support member. The outside surface 120 of the first support member 12 is provided by the two support sections 301 and 302. Thus, the top support member 22 can be readily pushed over the connecting area 300 without jamming.

An end position damping 23 is provided in the region of the top end of the second support member 22. An end position damping may also be provided at the bottom end.

The control cable 17 may be coupled with a cable tensioner, not shown in detail, to convey to the user a defined functioning feel in any position of the actuating device. In preferred configurations, a cable tensioner is neither necessary nor provided. This will provide the user with a defined, tactile feedback at any time when touching or moving the actuating device. The cable tensioner comprises a biasing unit and a slider component that is axially guided inside the piston member. The slider component is urged to a biased state by means of the biasing unit, retaining the cable tensioned at all times.

The bicycle component 1 is equipped with an anti-twist protection 400, which blocks any twisting of the second support member 22 together with the saddle 103 relative to the first support member 12. To this end, a guiding groove 403 is incorporated in the second support member 12. The guiding groove 403 displaceably accommodates a clamping element 401, which is fastened to the first support member 12. In this way the support members 12, 22 are non-rotatably interlinked.

For compensating rotation play, resulting e.g., from play of the clamping element 401 in the guiding groove 403, the anti-twist protection 400 is provided with a spline device 402. The spline device 402 comprises a spline unit 412, which is urged against the clamping element 401 in the extended position 10. By way of the clamping element 401 and the spline unit 412 being pressed together, the clamping element 401 is displaced sideways in the guiding groove 403, transverse to the axial direction relative to the guiding groove 403. Since the clamping element 401 is fastened to the bicycle 100 through the support member 12, it is not the clamping element 401 that moves but the guiding groove 403, together with the second support member 22.

By way of this displacement, the clamping element 401 is urged to a longitudinal wall 413 of the guiding groove 403 by way of the longitudinal face 411. This causes the support members 12, 22 to be braced against one another and the rotation play, to be compensated in both rotational directions. Thus, the saddle 103 is fixed in the extended position 10 without any irritating rotation play.

The clamping element 401 is provided with a bore 441. This is where a tool can be applied for removing the clamping element 401 for servicing.

In the embodiment shown, the clamping element 401 and the spline unit 412 are disposed above the bolt members 4.

The compensation of the rotation play according to the invention does not require particularly narrow tolerances for the clamping element 401 and the guiding groove 403, so that extensive fitting can be omitted. The invention introduced even advantageously accommodates the clamping element 401 in the guiding groove 403 at large tolerances respectively at minimum play. Thus, the spline unit 412 has sufficient space for moving the clamping element 401 in the guiding groove 403. Another advantage is that the larger tolerance considerably simplifies manufacturing the guiding groove 403 and also the clamping element 401. Moreover, guiding the clamping element 401 in the guiding groove 403 can be considerably simpler.

Figure 5:
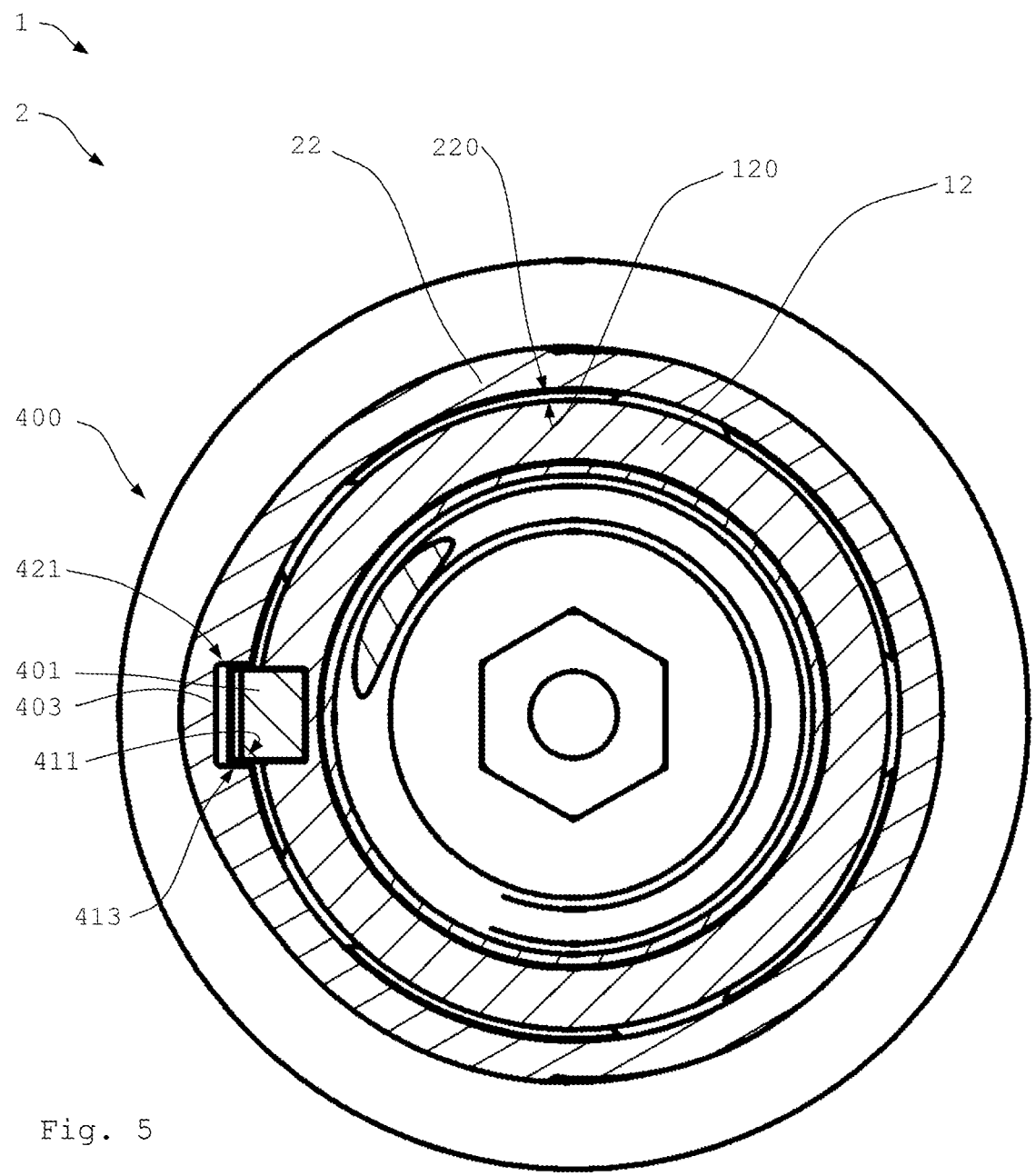
FIG. 5 the bicycle component in an illustration sectioned along the line B-B in FIG. 2 in a bottom view.

FIG. 5 particularly clearly shows the arrangement of the clamping element 401 in the guiding groove 403 between the support members 12, 22. With the arrangement shown, the anti-twist protection 400 also offers an axial guide for the support members 12, 22. It can also be clearly seen that the second support member 22 shows an increased wall thickness in the region of the guiding groove 403, and thus a non-round outer cross-sectional contour. The clamping element 401 is recessed in a receiving space 421 in the first support member 12, from which it projects into the guiding groove 403 of the second support member 22.

The anti-twist protection 400 presented can operate with one single guiding groove 403 and with one single clamping element 401 only. This considerably saves weight and manufacturing expenses.

When adjusting the seat post device 2, the clamping element 401 glides through the guiding groove 403 in the axial direction. In the arrangement of the support members 12, 22 shown, the clamping element 401 together with the first support member 12 remain stationary on the frame structure 102, while the second support member 22 moves up and down with the guiding groove 403. Accordingly, pressing the clamping element 401 and the spline unit 412 together causes the second support member 22 to rotate relative to the first support member 12 and its clamping element 401.

In order to compensate the rotation play in the extended position 10, the clamping element 401 is disposed on an upper end portion of the first support member 12 and the spline unit, on a lower end portion of the second support member 22.

When the spline unit 412 and the clamping element 401 are pressed together and the clamping element 401 bears against the longitudinal wall 413, this state can be fixed by the locking device 3. Thus, compensation of the rotation play coincides with locking the seat post device 2 in the extended position 10. When the locking device 3 is actuated, the lock is released, and the extended position 10 is left, the spline unit 412 moves away from the clamping element 401.

In the anti-twist protection 400 shown, the energy storage device 9 presses the clamping element 401 and the spline unit 412 together. Thus, the rotation play is automatically compensated by extending the seat post device 2. As the extended position 10 is reached, this state is fixed.

Figure 6:
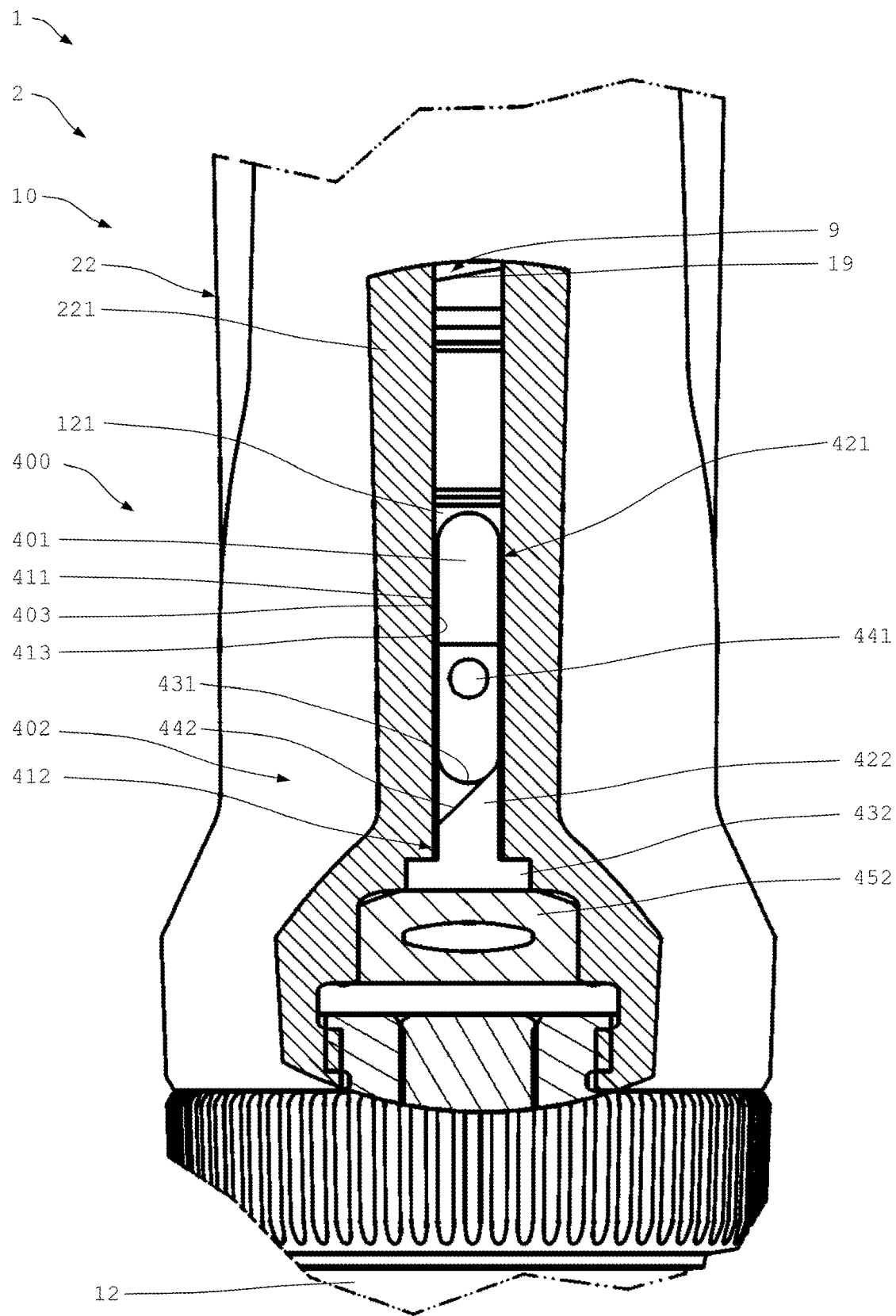
FIG. 6 a partial cutaway detail illustration of the bicycle component in FIG. 2.

FIG. 6 shows particularly clearly that the spline unit 412 comprises a spline section which extends into the guiding groove 403. The spline unit 412 moreover comprises a linking section 432.

The linking section 432 is recessed into the second support member 22 outside of the guiding groove 403 and serves for aligning the spline unit 412. The fit of the linking section 432 shows a narrower tolerance than does the fit of the spline section 422. Thus, the spline section 422 is received in the guiding groove 403 with play. A retaining member 452 secures respectively fastens the spline unit 412 in the guiding groove 403. The retaining member 452 may serve as a mechanical stopper for limiting the travel when extending the support members 12, 22.

The spline section 422 is exemplarily configured with a slanted spline profile 442. The clamping element 401 exemplarily shows a rounded clamping profile 431.

Figure 7:
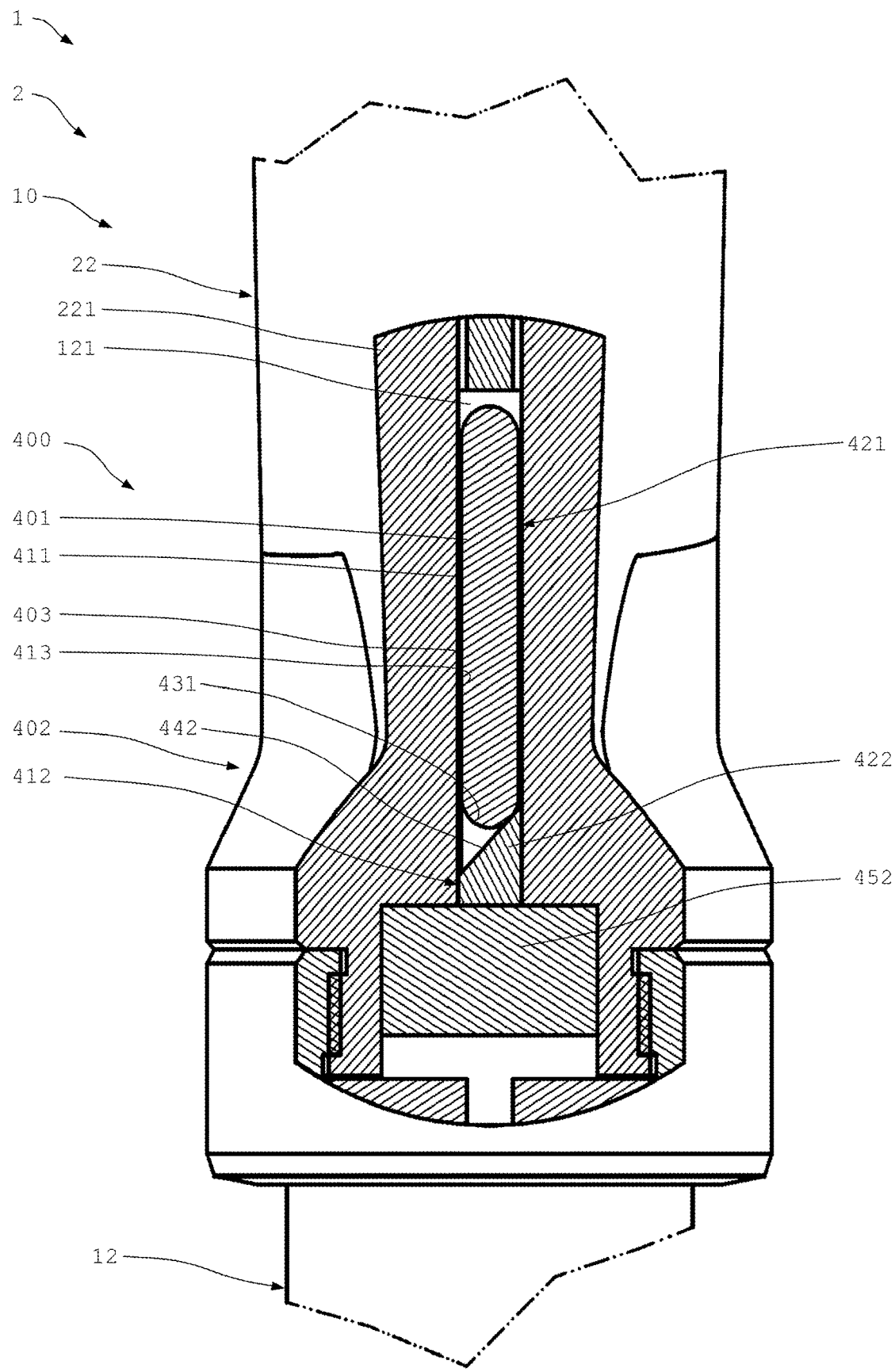
FIG. 7 a partial cutaway detail illustration of a configuration of the bicycle component in FIG. 2.
Figure 11:
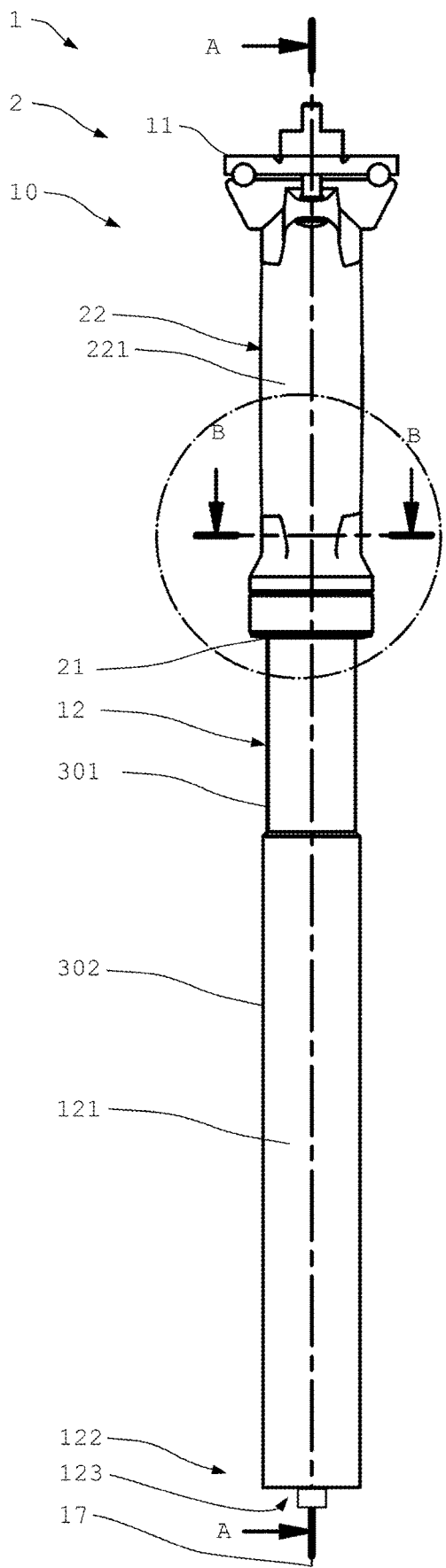
FIG. 11 a schematic illustration of another configuration of the bicycle component according to the invention in a side view.
Figure 12:
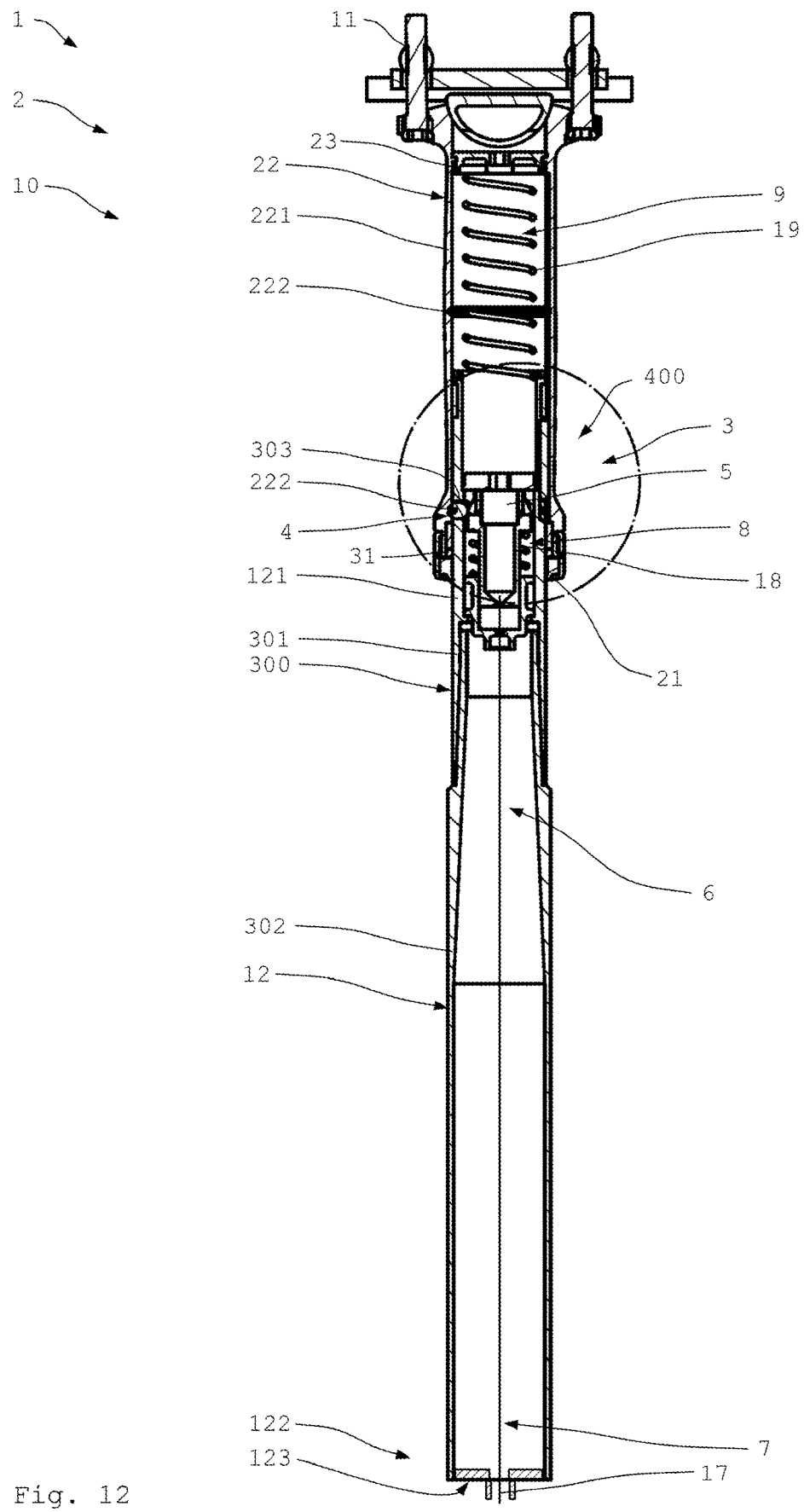
FIG. 12 the bicycle component in an illustration sectioned along the line A-A in FIG. 11, in a side view.
Figure 13:
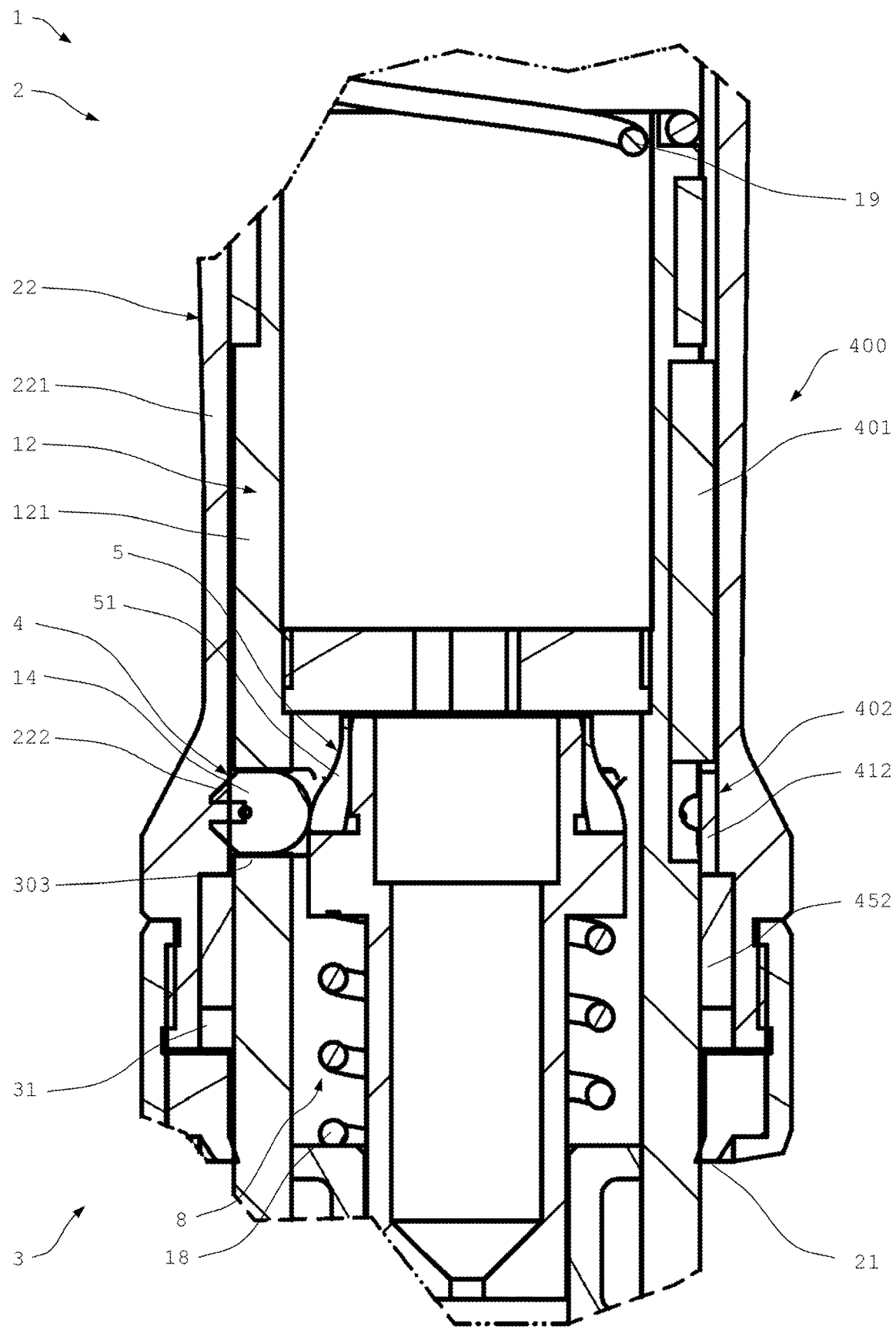
FIG. 13 a sectional detail illustration of the bicycle component in FIG. 12.
Figure 14:
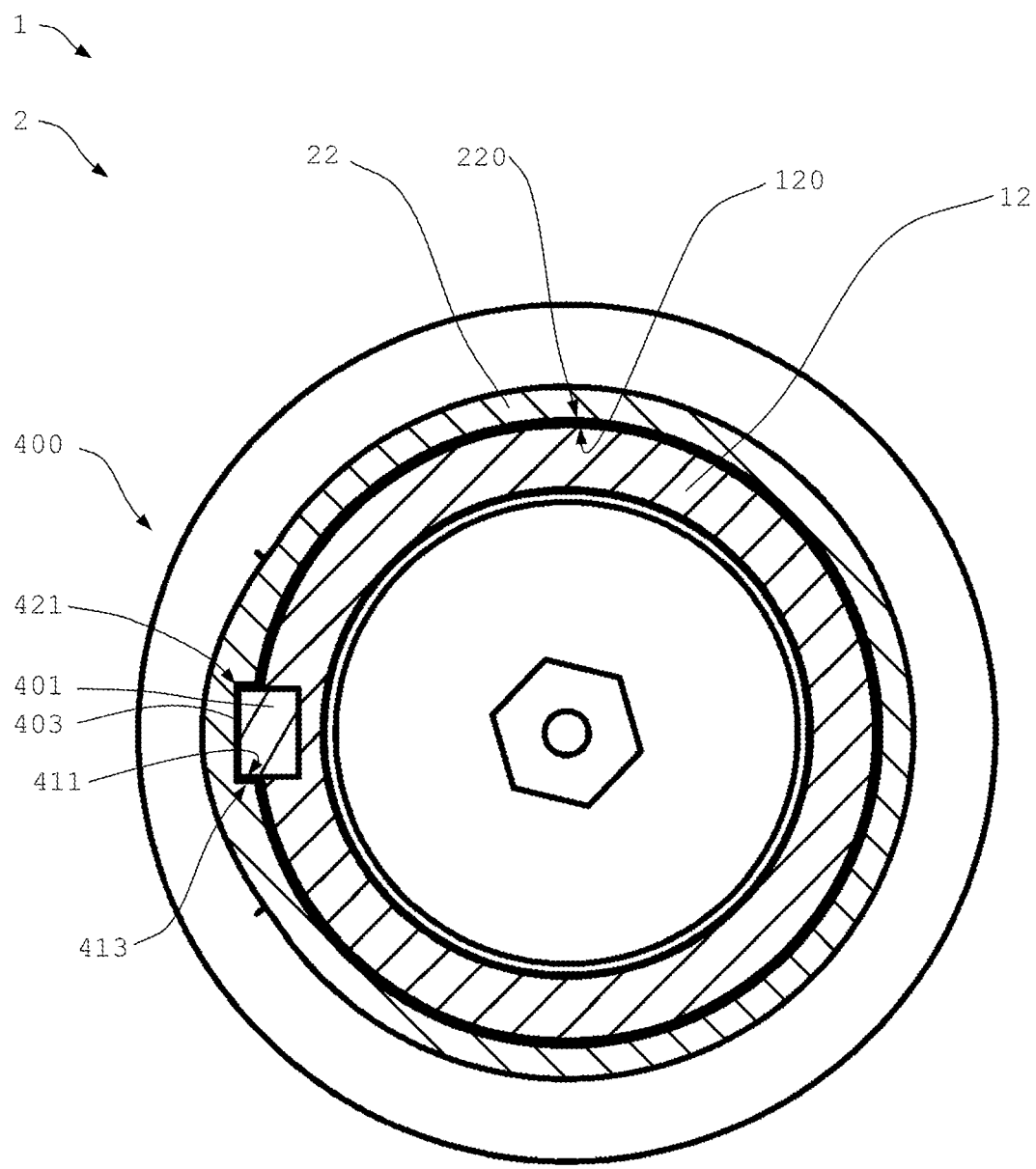
FIG. 14 the bicycle component in a sectional illustration along the line B-B in FIG. 11, in a bottom view.
Figure 15:
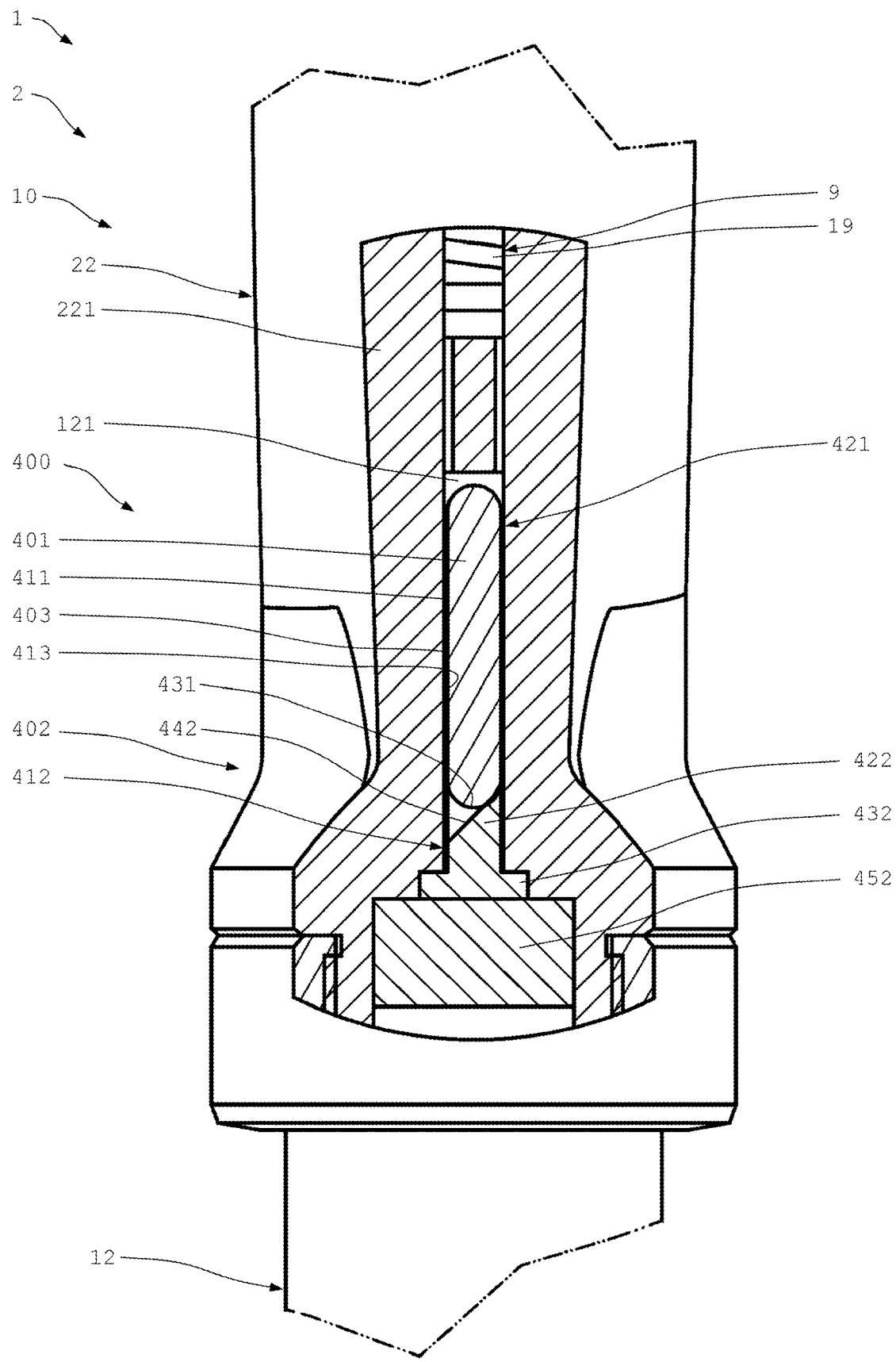
FIG. 15 a partial cutaway detail illustration of the bicycle component in FIG. 11.

FIG. 7 shows the bicycle component 1 in the illustration according to FIG. 6 with an alternative configuration of the spline unit 412. The spline unit 412 is provided by the spline section 422 only, and is completely accommodated in the guiding groove 403. The linking section 432 has been omitted. The retaining member 452 secures respectively fastens the spline unit 412 in the guiding groove 403.

FIGS. 8 to 10 each show a spline profile 442 of a spline unit 412 with a corresponding clamping profile 431 of a clamping element 401.

The spline profile 442 shown in the FIG. 8 is partially slanted and partially flat, and the clamping profile is rounded or pitch-circular.

The spline profile 442 shown in the FIG. 9 is U-shaped. The clamping profile 431 interacting therewith is pointed.

The spline profile 442 shown in the FIG. 10 is V-shaped, and the clamping profile 431 interacting therewith is rounded respectively pitch-circular. These profiles 442, 431 cause the clamping element 401 to be centered in the guiding groove when it is urged against the spline unit 412.

FIGS. 11 to 15 show, in analogy to the FIGS. 2 to 6, the bicycle component 1 in an alternative configuration. In the embodiment shown, among other things the clamping element 401 is disposed above the bolt members 4, while the spline unit 412 is disposed overlapping with the bolt members 4.

The cable control 7 here comprises a continuous control cable 17. The control cable 17 extends from the piston member 5 through the lower support member 12, which it exits at one end 122, which can be received in the saddle tube 104 of the bicycle 100. The control cable 17 exits from the support member on an axial front face 123. A control cable sleeve, not shown in detail, can be supported on this axial front face 123.

While a particular embodiment of the present bicycle component with an adjustable seat post device has been described herein, it will be appreciated by those skilled in the art that changes and modifications may be made thereto without departing from the invention in its broader aspects and as set forth in the following claims.

| List of reference numerals: | |
| --- | --- |
| 1 | bicycle component |
| 2 | seat post device |
| 3 | locking device |
| 4 | bolt member |
| 5 | piston member |
| 6 | actuating device |
| 7 | cable control |
| 8 | biasing device |
| 9 | energy storage device |
| 10 | position |
| 11 | saddle accommodation |
| 12 | first support member |
| 14 | sphere |
| 16 | control |
| 17 | control cable |
| 18 | spring |
| 19 | spring |
| 20 | position |
| 21 | mud guard |
| 22 | second support member |
| 23 | end position damper |
| 27 | supporting device |
| 31 | seal |
| 37 | coupling member |
| 51 | cone |
| 100 | bicycle |
| 101 | seat tube clamp |
| 102 | frame structure |
| 103 | saddle |
| 104 | seat tube |
| 105 | wheel |
| 106 | rim |
| 107 | frame |
| 108 | handlebar |
| 109 | fork |
| 110 | suspension fork |
| 111 | damper |
| 112 | pedal drive |
| 113 | derailleur |
| 120 | outside surface |

-continued

| List of reference numerals: | |
|---|---|
| 121 | wall |
| 122 | end |
| 123 | front face |
| 220 | inside surface |
| 221 | wall |
| 222 | recess |
| 223 | projection |
| 300 | connecting area |
| 301 | support section |
| 302 | support section |
| 303 | through hole |
| 400 | anti-twist protection |
| 401 | clamping element |
| 402 | spline device |
| 403 | guiding groove |
| 411 | longitudinal face |
| 412 | spline unit |
| 413 | longitudinal wall |
| 421 | takeup space |
| 422 | spline section |
| 431 | clamping profile |
| 432 | linking section |
| 441 | bore |
| 442 | spline profile |
| 452 | retaining member |

The invention claimed is:

1. A bicycle component for an at least partially muscle-powered bicycle, comprising:
a seat post device adjustable between at least two positions, including a first support member and a second support member, which are telescopically movable relative to one another in an axial direction;
at least one energy storage device, which is suitable and configured to be at least partially loaded by retracting the seat post device, and to be at least partially unloaded by extending the seat post device, so that the seat post device can be extended at least partially automatically, and wherein the energy storage device is suitable and configured to press the clamping element and the spline unit together;
at least one anti-twist protection with at least one clamping element which non-rotatably interlinks the support members and displaceably receives the first and second support members in a guiding groove, so that rotational movement of the first support member relative to the second support member can be at least partially blocked;
and that the anti-twist protection comprises at least one spline device with at least one spline unit that can be urged against the at least one clamping element in the axial direction, and that by pressing the at least one clamping element and the at least one spline unit together, the at least one clamping element can be moved relative to the guiding groove transverse to the axial direction.

2. The bicycle component according to claim 1, wherein the at least one clamping element and the at least one spline unit can be pressed together at least by adjusting the seat post device.

3. The bicycle component according to claim 1, wherein the at least one clamping element and the at least one spline unit are pressed together in one of the at least two positions.

4. The bicycle component according to claim 1, wherein by pressing together the at least one clamping element and the at least one spline unit causes the support members to be braced against one another, so that any rotation play between the support members can be blocked in both rotational directions.

5. The bicycle component according to claim 1, wherein the anti-twist protection comprises one guiding groove and/or one clamping element only.

6. The bicycle component according to claim 1, wherein the at least one clamping element is received in the guiding groove with minimum play, so as to ensure controlled displacement and/or tilting of the at least one clamping element in the guiding groove by the at least one spline unit.

7. The bicycle component according to claim 1, wherein by pressing together, the at least one clamping element and the at least one spline unit can be supported on one support member each, including configurations where the at least one clamping element is supported on the first support member and the at least one spline unit is supported on the second support member, or where the at least one clamping element is supported on the second support member and the at least one spline unit is supported on the first support member.

8. The bicycle component according to claim 1, wherein by pressing the at least one clamping element and the at least one spline unit together, the at least one clamping element can be displaced and/or tilted sideways and in this way at least one longitudinal face can be pressed at least in sections to at least one longitudinal wall of the guiding groove.

9. The bicycle component according to claim 1, wherein in adjusting the seat post device, the at least one clamping element is displaceable in the guiding groove in the axial direction.

10. The bicycle component according to claim 1, wherein the guiding groove and the at least one spline unit are both disposed on the same support member, and wherein the at least one clamping element is fastened to a different support member from that supporting the guiding groove and the at least one spline unit.

11. The bicycle component according to claim 1, wherein the at least one spline unit and the guiding groove are disposed on a radially inside surface of the second support member, and/or wherein the at least one clamping element is fastened to a radially outside surface of the first support member.

12. The bicycle component according to claim 10 wherein the support member shows an increased wall thickness in the region of the guiding groove, so as to result in particular in a non-round outer cross-sectional contour.

13. The bicycle component according to claim 1, wherein the at least one clamping element is partially recessed in at least one receiving space of the first support member, and partially protrudes beyond an outer circumference of the first support member, projecting into the guiding groove of the second support member.

14. The bicycle component according to claim 1, wherein by pressing the at least one clamping element and the at least one spline unit together, the first support member is rotatable relative to the second support member.

15. The bicycle component according to claim 1, wherein the at least one clamping element is disposed on an upper end portion of the first support member and wherein the at least one spline unit is disposed on a lower end portion of the second support member.

16. The bicycle component according to claim 1, wherein the at least one spline unit comprises at least one spline section extending into the guiding groove, and at least one linking section at least partially recessed in the second support member external of the guiding groove, and wherein a fit of the at least one linking section with the second support member shows a narrower tolerance than a fit of the at least one spline section with the second support member.

17. The bicycle component according to claim 1, comprising at least one locking device for locking the seat post device in at least one of the positions, wherein the locking device is suitable and configured to fix the at least one clamping element and the at least one spline unit in a state of being pressed together.

18. The bicycle component according to claim 17, wherein the at least one clamping element and/or the at least one spline unit are at least partially disposed above a bolt member of the locking device.

19. The bicycle component according to claim 1, wherein the at least one spline unit comprises at least one spline profile canted at least in sections, and wherein the at least one clamping element comprises at least one clamping profile interacting with the spline profile, and wherein the clamping profile is rounded.

20. The bicycle component according to claim 1, wherein the anti-twist protection provides an axial guide in adjusting the seat post device.

21. The bicycle component according to claim 1, wherein the second support member is configured to receive a saddle.

22. The bicycle component according to claim 1, wherein the first support member is disposed inside of the second support member at least in sections, and wherein for telescoping the seat post device, the second support member can be moved over the first support member at least in sections.

23. The bicycle component according to claim 1, wherein by pressing the at least one clamping element and the at least one spline unit together, the at least one clamping element can be centrally aligned in the guiding groove.

24. A bicycle that is at least partially muscle-powered, comprising at least one bicycle component according to claim 1.

25. A bicycle component for an at least partially muscle-powered bicycle, comprising:
a seat post device adjustable between at least two positions, including at least two support members, a first support member and a second support member, which are telescopically movable relative to one another in an axial direction, where the first support member is disposed inside of the second support member at least in sections and wherein for telescoping the seat post device, the second support member can be moved over the first support member at least in sections;
at least one anti-twist protection with at least one clamping element which non rotatably interlinks the support members and displaceably receives the support members in a guiding groove, so that rotational movement of the first support member relative to the second support member can be at least partially blocked;
and the anti-twist protection comprises at least one spline device with at least one spline unit that can be urged against the at least one clamping element in the axial direction, and that by pressing the at least one clamping element and the at least one spline unit together, the at least one clamping element can be moved relative to the guiding groove transverse to the axial direction.

26. A bicycle component for an at least partially muscle-powered bicycle, comprising:
a seat post device adjustable between at least two positions, including at least two support members, a first support member and a second support member, which are telescopically movable relative to one another in an axial direction;
at least one anti-twist protection with at least one clamping element which non rotatably interlinks the support members and displaceably receives the support members in a guiding groove, so that rotational movement of the first support member relative to the second support member can be at least partially blocked;
where the anti-twist protection comprises at least one spline device with at least one spline unit that can be urged against the at least one clamping element in the axial direction, and that by pressing the at least one clamping element and the at least one spline unit together, the at least one clamping element can be moved relative to the guiding groove transverse to the axial direction; and
the spline unit comprises at least one spline section extending into the guiding groove, and at least one linking section at least partially recessed in the second support member external of the guiding groove, and wherein a fit of the at least one linking section with the second support member shows a narrower tolerance than a fit of the at least one spline section with the second support member.

* * * * *